US007082486B2

(12) United States Patent
DeWitt, Jr. et al.

(10) Patent No.: US 7,082,486 B2
(45) Date of Patent: Jul. 25, 2006

(54) METHOD AND APPARATUS FOR COUNTING INTERRUPTS BY TYPE

(75) Inventors: Jimmie Earl DeWitt, Jr., Georgetown, TX (US); Frank Eliot Levine, Austin, TX (US); Christopher Michael Richardson, Austin, TX (US); Robert John Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 10/757,198

(22) Filed: Jan. 14, 2004

(65) Prior Publication Data

US 2005/0154813 A1     Jul. 14, 2005

(51) Int. Cl.
*G06F 13/24* (2006.01)
*G06F 12/02* (2006.01)

(52) U.S. Cl. ...................... 710/260; 718/107
(58) Field of Classification Search ........ 710/260–266, 710/48, 55; 711/202–208; 340/825.65; 718/107
See application file for complete search history.

(56) References Cited

U.S. PATENT DOCUMENTS

| 3,707,725 | A | * | 12/1972 | Dellheim ..................... 714/38 |
| 4,034,353 | A | | 7/1977 | Denny et al. |
| 4,145,735 | A | * | 3/1979 | Soga ........................... 710/264 |
| 4,291,371 | A | | 9/1981 | Holtey ........................ 364/200 |
| 4,794,472 | A | * | 12/1988 | Doyama ...................... 360/70 |
| 4,821,178 | A | | 4/1989 | Levin et al. |
| 4,825,359 | A | | 4/1989 | Ohkami et al. |
| 5,103,394 | A | | 4/1992 | Blasciak ..................... 395/575 |
| 5,113,507 | A | | 5/1992 | Jaeckel |
| 5,151,981 | A | | 9/1992 | Westcott et al. |
| 5,404,500 | A | | 4/1995 | Legvold et al. |
| 5,548,762 | A | * | 8/1996 | Creedon et al. ............. 710/260 |
| 5,581,482 | A | | 12/1996 | Wiedenman et al. |
| 5,594,864 | A | | 1/1997 | Trauben |
| 5,691,920 | A | | 11/1997 | Levine et al. .......... 364/551.01 |
| 5,754,839 | A | | 5/1998 | Pardo et al. |
| 5,758,168 | A | | 5/1998 | Mealey et al. |
| 5,774,724 | A | | 6/1998 | Heisch ........................ 395/704 |
| 5,797,019 | A | | 8/1998 | Levine et al. |
| 5,822,578 | A | | 10/1998 | Frank et al. |
| 5,926,640 | A | * | 7/1999 | Mason et al. ................ 713/320 |
| 5,930,508 | A | | 7/1999 | Faraboschi et al. ......... 395/706 |
| 5,937,437 | A | | 8/1999 | Roth et al. .................. 711/202 |

(Continued)

FOREIGN PATENT DOCUMENTS

JP      2000029731      12/1999

(Continued)

OTHER PUBLICATIONS

"digital mobile communication system designed for nationwide police activities—WIDE system" by Inoue, R. (abstract only) Publication Date: Oct. 2–4, 1996.*

(Continued)

*Primary Examiner*—Gopal C. Ray
(74) *Attorney, Agent, or Firm*—Duke W. Yee; Herman Rodriguez; Gerald H. Glanzman

(57) ABSTRACT

A method, apparatus, and computer instructions for counting interrupts by type. An interrupt count is incremented when a particular type of interrupt occurs. The count may be stored in the IDT or an interrupt count table outside the IDT. The interrupt unit increments the count each time a particular type of interrupt occurs. In the event of a potential count overflow, the mechanism of the present invention provides logic necessary to notify software in order to handle the overflow.

27 Claims, 4 Drawing Sheets

U.S. PATENT DOCUMENTS

| | | | |
|---|---|---|---|
| 5,938,778 A | 8/1999 | John, Jr. et al. ............... 714/45 |
| 5,966,537 A | 10/1999 | Ravichandran ............. 395/709 |
| 5,987,250 A | 11/1999 | Subrahmanyam ........... 395/704 |
| 6,070,009 A | 5/2000 | Dean et al. .................. 395/704 |
| 6,101,524 A | 8/2000 | Choi et al. ................... 709/102 |
| 6,134,676 A | 10/2000 | VanHuben et al. ........... 714/39 |
| 6,148,321 A | 11/2000 | Hammond |
| 6,161,187 A * | 12/2000 | Mason et al. ................ 713/322 |
| 6,163,840 A | 12/2000 | Chrysos et al. |
| 6,185,652 B1 * | 2/2001 | Shek et al. .................. 710/263 |
| 6,189,141 B1 | 2/2001 | Benitez et al. .................. 717/4 |
| 6,192,513 B1 | 2/2001 | Subrahmanyam ............... 717/5 |
| 6,206,584 B1 | 3/2001 | Hastings ................. 395/183.11 |
| 6,223,338 B1 | 4/2001 | Smolders ........................ 717/4 |
| 6,243,804 B1 | 6/2001 | Cheng ......................... 712/228 |
| 6,256,775 B1 | 7/2001 | Flynn ............................. 717/4 |
| 6,275,893 B1 | 8/2001 | Bonola |
| 6,286,132 B1 | 9/2001 | Tanaka et al. .................. 717/4 |
| 6,324,689 B1 | 11/2001 | Lowney et al. ................. 717/9 |
| 6,330,662 B1 | 12/2001 | Patel et al. ................... 712/236 |
| 6,351,844 B1 | 2/2002 | Bala .............................. 717/4 |
| 6,374,364 B1 | 4/2002 | McElroy et al. .............. 714/10 |
| 6,378,064 B1 | 4/2002 | Edwards et al. |
| 6,408,386 B1 | 6/2002 | Hammond et al. |
| 6,430,741 B1 | 8/2002 | Mattson, Jr. et al. ........ 717/154 |
| 6,442,585 B1 | 8/2002 | Dean et al. .................. 709/108 |
| 6,446,029 B1 | 9/2002 | Davidson et al. ........... 702/186 |
| 6,480,938 B1 | 11/2002 | Vondran, Jr. ................ 711/125 |
| 6,480,966 B1 | 11/2002 | Rawson, III |
| 6,549,998 B1 | 4/2003 | Pekarich et al. |
| 6,574,727 B1 | 6/2003 | Davidson et al. |
| 6,681,387 B1 | 1/2004 | Hwu et al. |
| 6,757,771 B1 | 6/2004 | Christie |
| 6,775,728 B1 | 8/2004 | Zimmer et al. |
| 6,925,424 B1 | 8/2005 | Jones et al. |
| 2001/0032305 A1 | 10/2001 | Barry ........................... 712/34 |
| 2002/0019976 A1 | 2/2002 | Patel et al. .................. 717/137 |
| 2002/0124237 A1 | 9/2002 | Sprunt et al. ................ 717/127 |
| 2002/0129309 A1 | 9/2002 | Floyd et al. ................. 714/724 |
| 2002/0147965 A1 | 10/2002 | Swaine et al. .............. 717/124 |
| 2002/0199179 A1 | 12/2002 | Lavery et al. ............... 717/158 |
| 2003/0101367 A1 | 5/2003 | Bartfai et al. |
| 2003/0135720 A1 | 7/2003 | DeWitt et al. |
| 2003/0154463 A1 | 8/2003 | Betker et al. |

FOREIGN PATENT DOCUMENTS

| | | |
|---|---|---|
| JP | 2000347863 | 12/2000 |

OTHER PUBLICATIONS

Kikuchi, "Parallelization Assist System", Joho Shori, vol 34, No. 9, Sep. 1993, pp. 1158-1169.

Cohen et al., "Hardware-Assisted Characterization of NAS Benchmarks", Cluster Computing, vol. 4, No. 3, Jul. 2001, pp. 189-196.

Talla et al., "Evaluating Signal Processing and Multimedia Applications on SIMD, VLIW and Sup r Scalar Architectures", International Conference on Computer Design, Austin, Sep. 17-20, 2000, pp. 163-172.

Iwasawa et al., "Parallelization Method of Fortran DO Loops by Parallelizing Assist System", Transactions of Information Processings Society of Japan, vol. 36, No. 8, Aug. 1995, pp. 1995-2006.

Talla et al., "Execution Characteristics of Multimedia Applications on a Pentium II Processor", IEEE International Performance, Computing, and Communications Conference, 19th, Phoenix, F b. 20-22, 2000, pp. 516-524.

IBM Research Disclosure Bulletin 444188, "Enable Debuggers as an Objective Perormance Measurement Toll for Software Development Cost Reduction", Apr. 2001, pp. 686-688.

U.S. Appl. No. 09/435,069, filed Nov. 4, 1999, Davidson et al., Method and Apparatus for Instruction Sampling for Performance Monitoring and Debug.

U.S. Appl. No. 08/538,071, filed Oct. 2, 1995, Gover et al., Method and System for Selecting and Distinguishing an Event S quenc using an Effective Addr ss in a Pr cessing System.

U.S. Appl. No. 10/675,777, filed Sep. 30, 2003, DeWitt, Jr. et al., Method and Apparatus for Counting Instruction Execution and Data Accesses.

U.S. Appl. No. 10/674,604, filed Sep. 30, 2003, Levine et al., Method and Apparatus for Selectively Counting Instructions and Data Accesses.

U.S. Appl. No. 10/675,831, filed Sep. 30, 2003, DeWitt, Jr. et al., Method and Apparatus for Generating Interrupts Upon Execution of Marked Instructions and Upon Access to Marked Memory Locations.

U.S. Appl. No. 10/675,775, filed Sep. 30, 2003, DeWitt, Jr. et al., Method and Apparatus for Counting Data Accesses and Instruction Executions that Exceed a Threshold.

U.S. Appl. No. 10/675,776, filed Sep. 30, 2003, DeWitt, Jr. et al., Method and Apparatus for Counting Execution of Specific Instructions and Accesses to Specific Data Locations.

U.S. Appl. No. 10/675,751, filed Sep. 30, 2003, DeWitt, Jr. et al., Method and Apparatus for Debug Support for Individual Instructions and Memory Locations.

U.S. Appl. No. 10/675,721, filed Sep. 30, 2003, Levine et al., Method and Apparatus to Autonomically Select Instructions for Selective Counting.

U.S. Appl. No. 10/674,642, filed Sep. 30, 2003, Levine et al., Method and Apparatus to Autonomically Count Instruction Execution for Applications.

U.S. Appl. No. 10/674,606, filed Sep. 30, 2003, Levine et al., Method and Apparatus to Autonomically Take an Exception on Specified Instructions.

U.S. Appl. No. 10/675,783, filed Sep. 30, 2003, Levine et al., Method and Apparatus to Autonomically Profile Applications.

U.S. Appl. No. 10/675,872, filed Sep. 30, 2003, DeWitt, Jr. et al., Method and Apparatus for Counting Instruction and Memory Location Ranges.

U.S. Appl. No. 10/751,186, filed Jan. 14, 2004, DeWitt, Jr. et al., Method and Apparatus for Qualifying Collection of Performance Monitoring Events by Types of Interrupt when Interrupt Occurs.

U.S. Appl. No. 10/751,192, filed Jan. 14, 2004, DeWitt, Jr. et al., Method and Apparatus for Providing Pre and Post Handlers for Recording Events.

Mano, "Computer System Architecture", Prentice-Hall, Inc., 2nd Ed., 1982, pp. 434-443.

Short, "Embedded Microprocessor Systems Design: An Introduction Using the Intel 80C188EB" Prentice-Hall, Inc.: 1998, p. 761.

Wikipedia "JavaServer Pages" downloaded Jan. 24, 2006 http://en.wikipedia.org/wiki/JavaServer_Pages.

"Hardware Cycle Based memory Residency", IBM, May 22, 2003, ip.com, IPCOM000012728D, pp. 1-2.

Hyde, "The Art of Assembly Language", 2001, Linux Edition, pp. 247-248, retrieved Mar. 1, 2005 from http://webster.cs.ucr.edu/AoA/Linux/PDFs/0_PDFIndexLinux.html.

* cited by examiner

| OFFSET ADDRESS | CONTENT |
|---|---|
| 0x0000 | VHPT DATA FAULT COUNT (8 BYTES) |
| 0x0008 | VHPT DATA FAULT CODE (400 BYTES) |
| 0x0408 | DATA TLB FAULT COUNT |
| 0x0410 | DATA TLB FAULT CODE |
| 0x0810 | DATA NESTED TLB FAULT COUNT |
| 0x0818 | DATA NESTED TLB FAULT CODE |
| 0x0c18 | DATA ACCESS RIGHT FAULT COUNT |
| 0x0c20 | DATA ACCESS RIGHT FAULT CODE |
| 0x1020 | DATA DEBUG FAULT COUNT |
| 0x1028 | DATA DEBUG FAULT CODE |

402 INTERRUPT DESCRIPTOR TABLE (IDT)

*FIG. 4*

FORMULA = 8 × CountOffset + 0x4000

INTERRUPT COUNTER TABLE (ICT)

| OFFSET ADDRESS | COUNT |
|---|---|
| 0x4000 | 0 |
| 0x4008 | 0 |
| 0x4010 | 0 |
| 0x4018 | 0 |
| 0x4020 | 0 |
| 0x4028 | 0 |
| 0x4030 | 0 |
| 0x4038 | 0 |
| 0x4040 | 0 |
| 0x4048 | 0 |

INTERRUPT DESCRIPTOR TABLE (IDT)

| OFFSET ADDRESS | INTERRUPT TYPE | COUNT OFFSET |
|---|---|---|
| 0x0000 | VHPT DATA FAULT | 0 |
| 0x0400 | DATA TLB FAULT | 1 |
| 0x0800 | DATA NESTED TLB FAULT | 2 |
| 0x0c00 | DATA ACCESS RIGHTS FAULT | 3 |
| 0x1000 | DATA DEBUG FAULT | 4 |
| 0x1400 | DATA PAGE NOT PRESENT FAULT | 5 |
| 0x1800 | DATA KEY PERMISSION FAULT | 6 |
| 0x1c00 | FLOATING POINT TRAP | 7 |
| 0x2000 | TAKEN BRANCH TRAP | 8 |
| 0x2400 | UNSUPPORTED DATA REFERENCE TRAP | 9 |

*FIG. 5*

METHOD AND APPARATUS FOR COUNTING INTERRUPTS BY TYPE

CROSS REFERENCE TO RELATED APPLICATIONS

The present invention is related to the following applications entitled "Method and Apparatus for Counting Instruction Execution and Data Accesses", Ser. No. 10/675,777, filed on Sep. 30, 2003; "Method and Apparatus for Selectively Counting Instructions and Data Accesses", Ser. No. 10,674,604, filed on Sep. 30, 2003; "Method and Apparatus for Generating Interrupts Upon Execution of Marked Instructions and Upon Access to Marked Memory Locations", Ser. No. 10/675,831, filed on Sep. 30, 2003; "Method and Apparatus for Counting Data Accesses and Instruction Executions that Exceed a Threshold", Ser. No. 10/675,778, filed on Sep. 30, 2003; "Method and Apparatus for Counting Execution of Specific Instructions and Accesses to Specific Data Locations", Ser. No. 10/675,776, filed on Sep. 30, 2003; "Method and Apparatus for Debug Support for Individual Instructions and Memory Locations", Ser. No. 10/675,751, filed on Sep. 30, 2003; "Method and Apparatus to Autonomically Select Instructions for Selective Counting", Ser. No. 10/675,721, filed on Sep. 30, 2003; "Method and Apparatus to Autonomically Count Instruction Execution for Applications", Ser. No. 10/674,642, filed on Sep. 30, 2003; "Method and Apparatus to Autonomically Take an Exception on Specified Instructions", Ser. No. 10/674,606, filed on Sep. 30, 2003; "Method and Apparatus to Autonomically Profile Applications", Ser. No. 10/675,783, filed on Sep. 30, 2003; "Method and Apparatus for Counting Instruction and Memory Location Ranges", Ser. No. 10/675,872, filed on Sep. 30, 2003; "Method and Apparatus for Qualifying Collection of Performance Monitoring Events by Types of Interrupt When Interrupt Occurs", Ser. No. 10/757,186, filed on Jan. 14, 2004, and "Method and Apparatus for Providing Pre and Post Handlers for Recording Events", Ser. No. 10/757,192, filed on Jan. 14, 2004. All of the above related applications are assigned to the same assignee, and incorporated herein by reference.

BACKGROUND OF THE INVENTION

1. Technical Field

The present invention relates generally to an improved data processing system and, in particular, to a method and system for monitoring the performance of the processor in a data processing system when an interrupt occurs. Still more particularly, the present invention relates to a method, apparatus, and computer instructions for counting interrupts by type.

2. Description of Related Art

A typical data processing system utilizes processors to execute a set of instructions in order to perform a certain task, such as reading a specific character from the main memory. However, as the number of tasks required to be executed by the processor increases, the efficiency of the processor's access patterns to memory and the characteristics of such access become important factors for engineers seeking to optimize the system operation.

There are currently mechanisms in the prior art that can count occurrences of software-selectable events, such as cache misses, instructions executed, I/O data transfer requests, and the time a given process may take to execute within a data processing system. One such mechanism is a performance monitor. A performance monitor assists in performing an analysis of a system by monitoring selected characteristics and determining the state of the system at a particular time. The analysis may provide information of how the processor is used when instructions are executed and the processor's interaction with the main memory when data is stored. In addition, the analysis may provide detail regarding the amount of time that has passed between events occurring in the system. Thus, the performance monitor may be used to assist in analyzing system performance.

However, the performance monitor described above does not provide the ability to count a particular type of interrupt using hardware. An interrupt occurs when a device, such as, for example, a mouse or keyboard, raises an interrupt signal to notify the processor that an event has occurred. When the processor accepts an interrupt request, the processor completes its current instruction and passes control to an interrupt handler. The interrupt handler executes an interrupt service routine that is associated with the interrupt. An interrupt may also be caused by a specific machine language operation code, for example, Motorola 68000's TRAP, a product from Motorola, Inc. In this case, an unexpected software condition such as, for example, divide by zero causes the processor to store the current state, store identifying information about the particular interrupt, and pass control to an interrupt handler that handles this unexpected software condition.

An interrupt descriptor table (IDT) is a system table that associates each interrupt with corresponding interrupt handler containing corresponding interrupt service routines. The performance monitor described above also does not provide hardware support for counting interrupts by type. It would be advantageous to have an improved method, apparatus, and computer instructions for counting interrupts by type and storing the count in the IDT or outside of the IDT in an interrupt count table (ICT). In addition, it would be advantageous to have an improved method to support counting of interrupts by type using hardware instead of a software selectable performance monitor.

SUMMARY OF THE INVENTION

The present invention provides a method, apparatus, and computer instructions for counting interrupts by type. The mechanism of the present invention includes an interrupt unit that employs a hardware counter to count the interrupts and identify the interrupts by type. The interrupt count may be stored within a location in an interrupt descriptor table (IDT) or within an interrupt count table (ICT) outside of the IDT. If the count is stored in the IDT, the storage location is associated with the interrupt type, so that the interrupt unit of the present invention and associated supporting software have knowledge of the location within the IDT where the count is stored. Alternatively, if the count is stored outside of the IDT, such as in an interrupt count table (ICT), the interrupt unit uses the address of the ICT, stored in a register, and the interrupt type to determine the location to increment the count.

The present invention also provides logic necessary to detect if a count overflow occurs. If an overflow of the count occurs, the mechanism of the present invention allows the supporting software to handle the overflow. Once the count is recorded for a particular interrupt type, the supporting software reads and resets the count value so that the user may collect the result at a later time for performance analysis.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is an exemplary diagram illustrating components for counting interrupts by type with the count stored outside of the IDT in accordance with a preferred embodiment of the present invention;

FIG. 5 is an exemplary diagram illustrating components for counting interrupt by type with the count stored within the IDT in accordance with a preferred embodiment of the present invention.

DETAILED DESCRIPTION OF THE PREFERRED EMBODIMENT

The present invention provides a method, apparatus, and computer instructions for counting interrupts by type. The mechanism of the present invention for counting interrupts by type is preferably implemented using an interrupt unit. The interrupt count is incremented when a particular type of interrupt occurs. The interrupt count may be stored in an interrupt descriptor table (IDT) or an interrupt count table (ICT) outside of the IDT.

Figure 1:
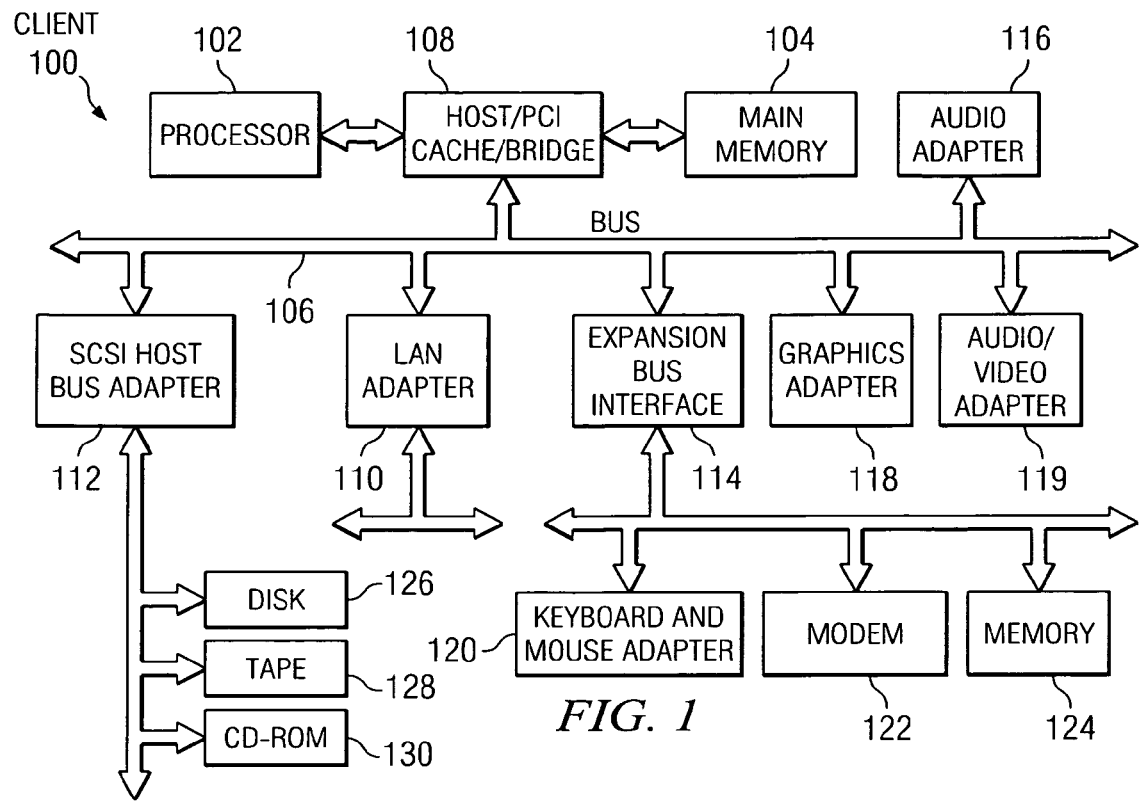
FIG. 1 is an exemplary block diagram of a data processing system in which the present invention may be implemented.

With reference now to FIG. 1, an exemplary block diagram of a data processing system is shown in which the present invention may be implemented. Client 100 is an example of a computer, in which code or instructions implementing the processes of the present invention may be located. Client 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, small computer system interface SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as Windows XP, which is available from Microsoft Corporation. An object oriented programming system such as Java may run in conjunction with the operating system and provides calls to the operating system from Java programs or applications executing on client 100. "Java" is a trademark of Sun Microsystems, Inc. Instructions for the operating system, the object-oriented programming system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1. Also, the processes of the present invention may be applied to a multiprocessor data processing system.

For example, client 100, if optionally configured as a network computer, may not include SCSI host bus adapter 112, hard disk drive 126, tape drive 128, and CD-ROM 130. In that case, the computer, to be properly called a client computer, includes some type of network communication interface, such as LAN adapter 110, modem 122, or the like. As another example, client 100 may be a stand-alone system configured to be bootable without relying on some type of network communication interface, whether or not client 100 comprises some type of network communication interface. As a further example, client 100 may be a personal digital assistant (PDA), which is configured with ROM and/or flash ROM to provide non-volatile memory for storing operating system files and/or user-generated data. The depicted example in FIG. 1 and above-described examples are not meant to imply architectural limitations.

The processes of the present invention are performed by processor 102 using computer implemented instructions, which may be located in a memory such as, for example, main memory 104, memory 124, or in one or more peripheral devices 126–130.

Figure 2:
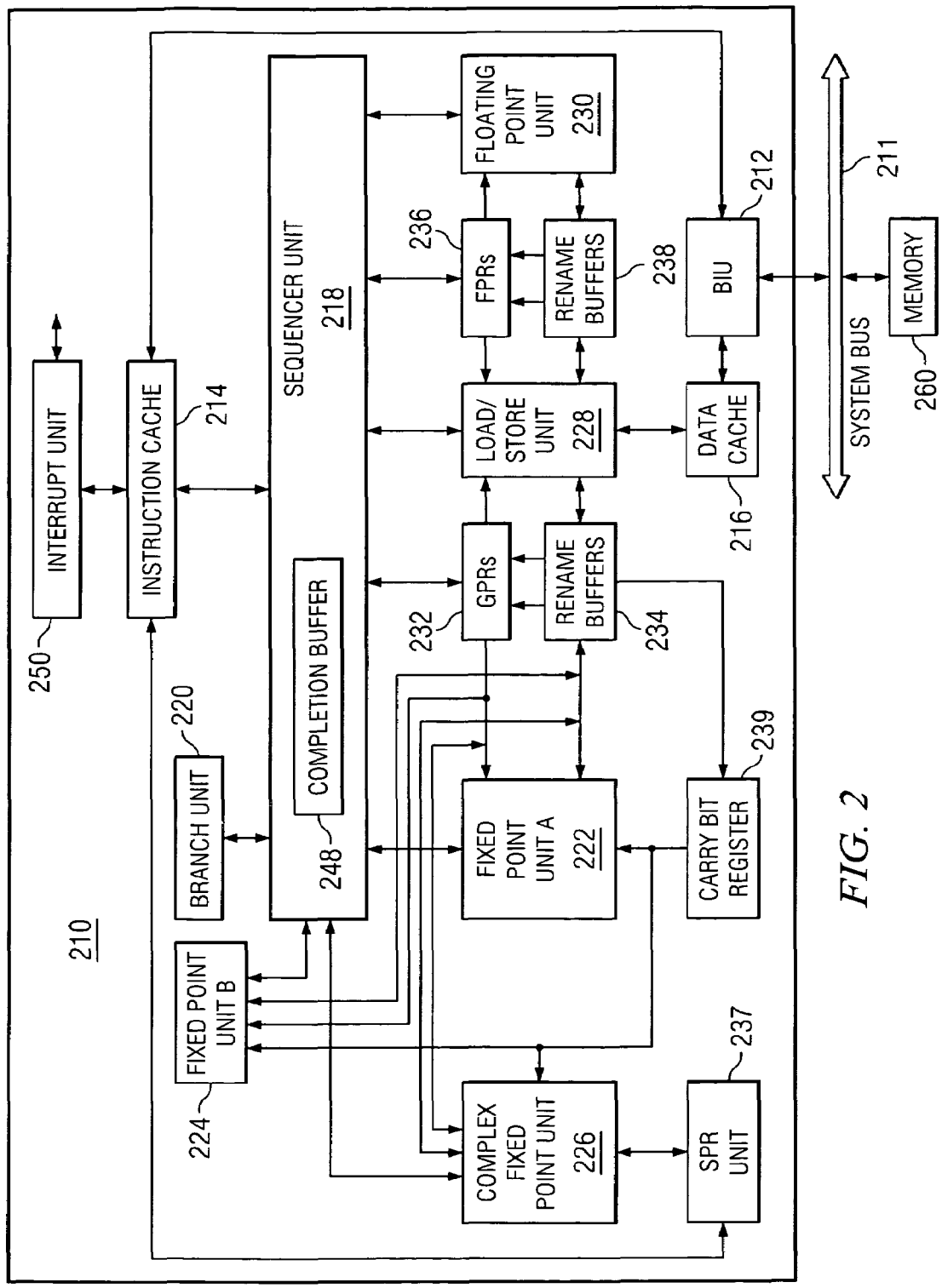
FIG. 2 is an exemplary block diagram of a processor system for processing information according to a preferred embodiment of the present invention.

Turning next to FIG. 2, an exemplary block diagram of a processor system for processing information is depicted in accordance with a preferred embodiment of the present invention. Processor 210 may be implemented as processor 102 in FIG. 1.

In a preferred embodiment, processor 210 is a single integrated circuit superscalar microprocessor. Accordingly, as discussed further herein below, processor 210 includes various units, registers, buffers, memories, and other sections, all of which are formed by integrated circuitry. Also, in the preferred embodiment, processor 210 operates according to reduced instruction set computer ("RISC") techniques. As shown in FIG. 2, system bus 211 is connected to a bus interface unit ("BIU") 212 of processor 210. BIU 212 controls the transfer of information between processor 210 and system bus 211.

BIU 212 is connected to an instruction cache 214 and to data cache 216 of processor 210. Instruction cache 214 outputs instructions to sequencer unit 218. In response to such instructions from instruction cache 214, sequencer unit 218 selectively outputs instructions to other execution circuitry of processor 210.

In addition to sequencer unit 218, in the preferred embodiment, the execution circuitry of processor 210 includes multiple execution units, namely a branch unit 220, a fixed-point unit A ("FXUA") 222, a fixed-point unit B ("FXUB") 224, a complex fixed-point unit ("CFXU") 226, a load/store unit ("LSU") 228, and a floating-point unit ("FPU") 230. FXUA 222, FXUB 224, CFXU 226, and LSU 228 input their source operand information from general-purpose architectural registers ("GPRs") 232 and fixed-point rename buffers 234. Moreover, FXUA 222 and FXUB 224 input a "carry bit" from a carry bit ("CA") register 239. FXUA 222, FXUB 224, CFXU 226, and LSU 228 output results (destination operand information) of their operations for storage at selected entries in fixed-point rename buffers 234. Also, CFXU 226 inputs and outputs source operand information and destination operand information to and from special-purpose register processing unit ("SPR unit") 237.

FPU 230 inputs its source operand information from floating-point architectural registers ("FPRs") 236 and floating-point rename buffers 238. FPU 230 outputs results (destination operand information) of its operation for storage at selected entries in floating-point rename buffers 238.

In response to a Load instruction, LSU 228 inputs information from data cache 216 and copies such information to selected ones of rename buffers 234 and 238. If such information is not stored in data cache 216, then data cache 216 inputs (through BIU 212 and system bus 211) such information from a system memory 239 connected to system bus 211. Moreover, data cache 216 is able to output (through BIU 212 and system bus 211) information from data cache 216 to system memory 239 connected to system bus 211. In response to a Store instruction, LSU 228 inputs information from a selected one of GPRs 232 and FPRs 236 and copies such information to data cache 216.

Sequencer unit 218 inputs and outputs information to and from GPRs 232 and FPRs 236. From sequencer unit 218, branch unit 220 inputs instructions and signals indicating a present state of processor 210. In response to such instructions and signals, branch unit 220 outputs (to sequencer unit 218) signals indicating suitable memory addresses storing a sequence of instructions for execution by processor 210. In response to such signals from branch unit 220, sequencer unit 218 inputs the indicated sequence of instructions from instruction cache 214. If one or more of the sequence of instructions is not stored in instruction cache 214, then instruction cache 214 inputs (through BIU 212 and system bus 211) such instructions from system memory 239 connected to system bus 211.

In response to the instructions input from instruction cache 214, sequencer unit 218 selectively dispatches the instructions to selected ones of execution units 220, 222, 224, 226, 228, and 230. Each execution unit executes one or more instructions of a particular class of instructions. For example, FXUA 222 and FXUB 224 execute a first class of fixed-point mathematical operations on source operands, such as addition, subtraction, ANDing, ORing and XORing. CFXU 226 executes a second class of fixed-point operations on source operands, such as fixed-point multiplication and division. FPU 230 executes floating-point operations on source operands, such as floating-point multiplication and division.

As information is stored at a selected one of rename buffers 234, such information is associated with a storage location (e.g. one of GPRs 232 or carry bit (CA) register 242) as specified by the instruction for which the selected rename buffer is allocated. Information stored at a selected one of rename buffers 234 is copied to its associated one of GPRs 232 (or CA register 242) in response to signals from sequencer unit 218. Sequencer unit 218 directs such copying of information stored at a selected one of rename buffers 234 in response to "completing" the instruction that generated the information. Such copying is called "writeback."

As information is stored at a selected one of rename buffers 238, such information is associated with one of FPRs 236. Information stored at a selected one of rename buffers 238 is copied to its associated one of FPRs 236 in response to signals from sequencer unit 218. Sequencer unit 218 directs such copying of information stored at a selected one of rename buffers 238 in response to "completing" the instruction that generated the information.

Processor 210 achieves high performance by processing multiple instructions simultaneously at various ones of execution units 220, 222, 224, 226, 228, and 230. Accordingly, each instruction is processed as a sequence of stages, each being executable in parallel with stages of other instructions. Such a technique is called "pipelining." In a significant aspect of the illustrative embodiment, an instruction is normally processed as six stages, namely fetch, decode, dispatch, execute, completion, and writeback.

In the fetch stage, sequencer unit 218 selectively inputs (from instruction cache 214) one or more instructions from one or more memory addresses storing the sequence of instructions discussed further hereinabove in connection with branch unit 220, and sequencer unit 218.

In the decode stage, sequencer unit 218 decodes up to four fetched instructions.

In the dispatch stage, sequencer unit 218 selectively dispatches up to four decoded instructions to selected (in response to the decoding in the decode stage) ones of execution units 220, 222, 224, 226, 228, and 230 after reserving rename buffer entries for the dispatched instructions' results (destination operand information). In the dispatch stage, operand information is supplied to the selected execution units for dispatched instructions. Processor 210 dispatches instructions in order of their programmed sequence.

In the execute stage, execution units execute their dispatched instructions and output results (destination operand information) of their operations for storage at selected entries in rename buffers 234 and rename buffers 238 as discussed further hereinabove. In this manner, processor 210 is able to execute instructions out-of-order relative to their programmed sequence.

In the completion stage, sequencer unit 218 indicates an instruction is "complete." Processor 210 "completes" instructions in order of their programmed sequence.

In the writeback stage, sequencer 218 directs the copying of information from rename buffers 234 and 238 to GPRs 232 and FPRs 236, respectively. Sequencer unit 218 directs such copying of information stored at a selected rename buffer. Likewise, in the writeback stage of a particular instruction, processor 210 updates its architectural states in response to the particular instruction. Processor 210 processes the respective "writeback" stages of instructions in order of their programmed sequence. Processor 210 advantageously merges an instruction's completion stage and writeback stage in specified situations.

In the illustrative embodiment, each instruction requires one machine cycle to complete each of the stages of instruction processing. Nevertheless, some instructions (e.g., complex fixed-point instructions executed by CFXU 226) may require-more than one cycle. Accordingly, a variable delay may occur between a particular instruction's execution and completion stages in response to the variation in time required for completion of preceding instructions.

Completion buffer 248 is provided within sequencer 218 to track the completion of the multiple instructions which are being executed within the execution units. Upon an indication that an instruction or a group of instructions have been completed successfully, in an application specified sequential order, completion buffer 248 may be utilized to initiate the transfer of the results of those completed instructions to the associated general-purpose registers.

In addition, processor 210 also includes interrupt unit 250, which is connected to instruction cache 214. Additionally, although not shown in FIG. 2, interrupt unit 250 is connected to other functional units within processor 210. Interrupt unit 250 may receive signals from other functional units and initiate an action, such as starting an error handling or trap process. In these examples, interrupt unit 250 is employed to generate interrupts and exceptions that may occur during execution of a program. Interrupt unit 250 may also be employed to count the occurrence of interrupts by type and increment the count values accordingly.

As mentioned above, the present invention provides a method, apparatus, and computer instructions for counting interrupts by type. In other words, the present invention provides a mechanism for counting the number of times a particular interrupt type occurs. An interrupt type may be, for example, a specific interrupt vector associated with an interrupt, such as Virtual Hash Page Table (VHPT) instruction fault or a translation lookaside buffer (TLB) data fault. The present invention allows for counting the number of these example interrupt types occurring within a defined period, for example, a number of clock cycles. In addition, the interrupt unit of the present invention, such as interrupt unit 250 in FIG. 2, uses hardware counters to increment the count rather than employing supporting software to perform the count as in the prior art.

Figure 3:
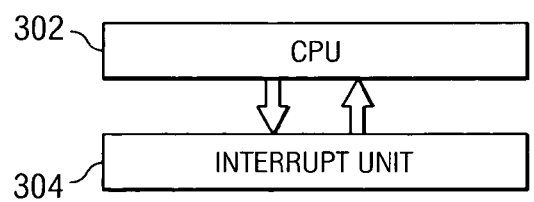
FIG. 3 is an exemplary diagram illustrating components for counting interrupts by type in accordance with a preferred embodiment of the present invention.

Turning to FIG. 3, an exemplary diagram illustrating components for counting interrupts by type is depicted in accordance with a preferred embodiment of the present invention. In this example implementation, central processing unit (CPU) 302 may be implemented as processor 210 in FIG. 2. When an interrupt occurs, CPU 302 sends a signal to interrupt unit 304 to request interrupt unit 304 generate an interrupt signal for a particular interrupt type. Interrupt unit 304 increments the count for the interrupt type when the signal is generated. The resulting data is stored and may be collected at a later time by the supporting software.

In one embodiment of the present invention, the mechanism of the present invention stores the count in the interrupt descriptor table (IDT). An interrupt descriptor table is a system table that associates each interrupt with a corresponding interrupt handler containing corresponding interrupt service routines. When a particular type of interrupt occurs, the interrupt unit increments the associated count. Each IDT entry is associated with a count storage area. The storage area is associated with the interrupt type, so that the interrupt unit of the present invention and associated supporting software have knowledge of the location within the IDT where the count is stored. Prior to the interrupt handler executing an interrupt service routine when a particular type of interrupt occurs, the interrupt unit of the present invention locates the memory address of the count in the IDT and increments the count value.

Turning to FIG. 4, an exemplary diagram illustrating components for counting interrupts by type with counts stored within the IDT is depicted in accordance with a preferred embodiment of the present invention. In this example implementation, an interrupt descriptor table (IDT) 402 includes offset addresses 404 and content 406 of the IDT. In this example, the count for each interrupt type or IDT entry, VHPT data fault count 408, is stored in IDT 402 with an offset address such as 0×0000 410. Corresponding code containing an interrupt service routine such as VHPT data fault code 412 is also stored in IDT 402 with the offset address of the code at 0×0008 414. In this example, the size of the count stored in the IDT is 8 bytes while the size of the code for each interrupt type is 400 bytes. However, the size of the code for each interrupt type may vary. Thus, the interrupt unit may locate the address of the count in the IDT for each interrupt type to increment.

In another embodiment of the present invention, the count is stored in an interrupt count table (ICT) outside of the IDT. The ICT stores count values for each interrupt type referenced by an offset address. The ICT is first allocated by supporting software and the processor is notified of the memory address of the ICT. The memory address of the ICT may be referenced through the use of a register. When a particular type of interrupt occurs, the interrupt unit goes to the memory address of the ICT and looks up the offset address of where the count is stored in the ICT for the particular interrupt type. In turn, the interrupt unit increments the count in the storage area and the processor continues to process the interrupt service routine of that type. Once the count is incremented, the supporting software may later read the value of the count and reset the count if necessary.

Turning to FIG. 5, an exemplary diagram illustrating components for counting interrupts by type with count stored outside of IDT is depicted in accordance with a preferred embodiment of the present invention. In this example implementation, an interrupt descriptor table (IDT) 502 includes offset addresses 504, interrupt types 506 and count offsets 508. Interrupt types 506 represented in IDT 502 are for illustrative purpose only.

In IDT 502, each interrupt type 506 corresponds to a offset address such as offset address 504 that identifies starting address of the associated interrupt service routine. The supporting software may be programmed with a formula such as formula 510. Formula 510 takes the count offset value such as count offset value 508 and multiply by 8. For example, VHPT data fault interrupt has a count offset value of 0, formula 510 multiplies 0 by 8, which results a value of 0. The result is then added to memory address 0×4000 in this example to derive offset address of the count. Memory address 0×4000 is the memory address of ICT 512 indicated by a register. In this example, 0 is added to memory address 0×4000, which results an offset address 0×4000 514. Using formula 510 and count offset 508, each interrupt type or IDT entry is associated with a different offset address where the count is stored. Thus, the interrupt unit may increment the count stored in the offset address calculated from formula 510 for each interrupt type.

The present invention also provides a mechanism for handling an overflow of the count. A potential overflow occurs when the number of bits used to store the count is about to wrap. The mechanism of the present invention provides logic necessary to indicate a potential overflow to the software by either setting an overflow flag in the processor status register (PSR) or by sending an interrupt signal to the processor to notify the processor an overflow may occur. The processor status register (PSR), in an Intel 64-bit processor architecture available from Intel Corporation, is a 64-bit register that maintains control information for the currently running process. As a result, if an overflow flag is set or an overflow interrupt signal is sent, the supporting software may handle the overflow accordingly, such as by reading the count and resetting the count value.

Figure 6:
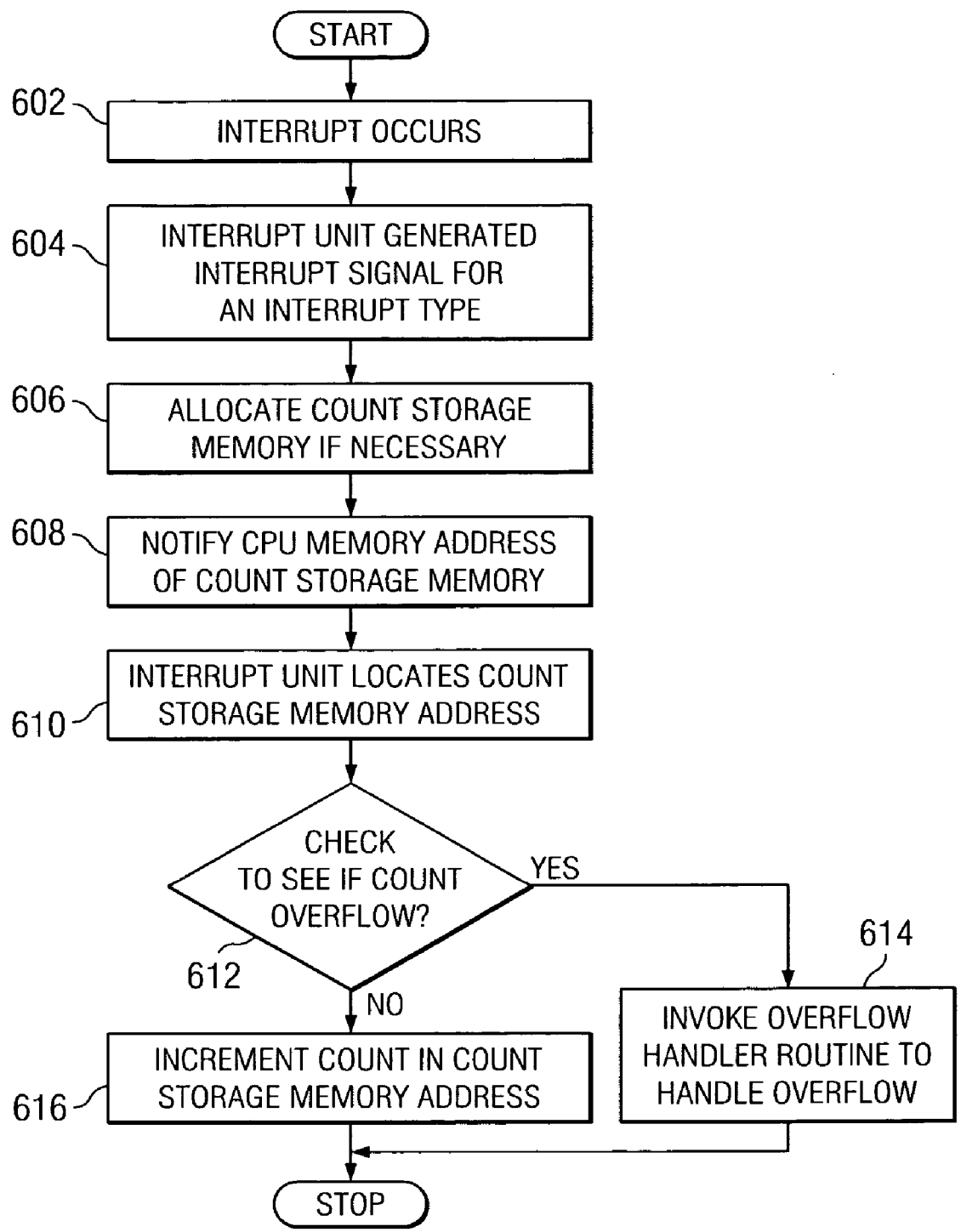
FIG. 6 is a flowchart outlining an exemplary process of counting interrupts by type in accordance with a preferred embodiment of the present invention.

Turning next to FIG. 6, a flowchart outlining an exemplary process of counting interrupts by type is depicted in accordance with a preferred embodiment of the present invention. The process begins when an interrupt occurs (step 602), the interrupt unit generates an interrupt signal for a particular interrupt type (step 604). The supporting software allocates count storage memory (step 606) if necessary and notifies the CPU of the memory address of the count storage memory (step 608). The interrupt unit locates the count storage offset address (step 610) and a determination is made as whether the count is about to overflow (step 612). If the count is about to overflow, an overflow handling routine may be invoked (step 614) to handle the overflow to read and reset the count, the process terminating thereafter. However, if the count is not about to overflow, the interrupt unit increments the count (step 616), the process terminating thereafter. The supporting software may later reset the count once the count is read.

Thus, the present invention provides a mechanism for counting the number of times a particular interrupt type occurs. The count may be stored in the IDT corresponding to each interrupt type or in an interrupt count table outside of the IDT. The supporting software and the interrupt unit have knowledge of memory addresses where the counts are stored. The interrupt unit may locate the count stored in a particular memory address in or outside of the IDT and increment it. In case of an overflow, an overflow handling routine may be invoke to handle the overflow accordingly.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system, comprising:
    an interrupt unit for receiving a signal for initiating an interrupt, the interrupt unit comprising a plurality of counters for counting the occurrence of a plurality of different types of interrupts by interrupt type; and
    a storage for storing a count value of each of the plurality of interrupt types.

2. The data processing system of claim 1, wherein the storage comprises an interrupt descriptor table that associates each interrupt with a corresponding interrupt handler, the interrupt descriptor table storing a count value of an interrupt type in an entry of the interrupt descriptor table.

3. The data processing system of claim 1, wherein the storage comprises an interrupt count table outside of an interrupt descriptor table of the system, the interrupt count table storing a count value of an interrupt type in an entry of the interrupt count table.

4. A data processing system, comprising:
    an interrupt unit;
    wherein the interrupt unit receives a signal for initiating an interrupt; and
    wherein the interrupt unit counts the occurrence of interrupts by type, a count value of an interrupt type being stored in an entry of an interrupt count table, wherein a count offset in an interrupt descriptor table corresponds to the interrupt type.

5. The data processing system of claim 4, wherein the count offset in the interrupt descriptor table is used to derive an offset address, corresponding to the count value of the interrupt type, in the interrupt count table.

6. A data processing system, comprising:
    an interrupt unit;
    wherein the interrupt unit receives a signal for initiating an interrupt; and
    wherein the interrupt unit counts the occurrence of interrupts by type, a count value of an interrupt type being stored in an entry of an interrupt count table; and
    a register having a pointer to a memory address of the interrupt count table.

7. The data processing system of claim 1, wherein the plurality of counters comprise hardware counters that count the occurrence of interrupts by type.

8. The data processing system of claim 1, wherein the types of interrupts include TLB (translation lookaside buffer) fault and VHPT (virtual hash page table) Instruction fault.

9. The data processing system of claim 1, wherein when a count is about to overflow, an overflow signal is sent.

10. A method for executing instructions on an information processing system, comprising the steps of:
    receiving an interrupt signal at an interrupt unit, wherein the interrupt signal is for initiating an interrupt in a processor;
    responsive to receiving the interrupt signal, incrementing a first counter of a plurality of counters based on a type of interrupt among a plurality of types of interrupts associated with the interrupt signal;
    wherein the plurality of counters counts the occurrence of interrupts by type of interrupt.

11. The method of claim 10, and further comprising storing a count value of the first counter in an entry of an interrupt descriptor table that associates each interrupt with a corresponding interrupt handler.

12. The method of claim 10, and further comprising storing a count value of an interrupt type in an entry of an interrupt count table outside of an interrupt descriptor table of the system.

13. A method for executing instructions on an information processing system, comprising the steps of:
    receiving an interrupt signal at an interrupt unit, wherein the interrupt signal is for initiating an interrupt in a processor;

responsive to receiving the interrupt signal, incrementing a first counter based on a type of interrupt associated with the interrupt signal;

wherein the first counter is one of a plurality of counters; and wherein the plurality of counters counts the occurrence of interrupts by type, a count value of an interrupt type being stored in an entry of an interrupt count table; and wherein a count offset in an interrupt descriptor table corresponds to the interrupt type.

14. The method of claim 13, wherein the count offset in the interrupt descriptor table is used to derive an offset address, corresponding to the count value of the interrupt type, in the interrupt count table.

15. A method for executing instructions on an information processing system, comprising the steps of:

receiving an interrupt signal at an interrupt unit, wherein the interrupt signal is for initiating an interrupt in a processor;

responsive to receiving the interrupt signal, incrementing a first counter based on a type of interrupt associated with the interrupt signal;

wherein the first counter is one of a of a plurality of counters; and wherein the plurality of counters counts the occurrence of interrupts by type, a count value of an interrupt type being stored in an entry of an interrupt count table; and further comprising:

a register having a pointer to a memory address of the interrupt count table.

16. The method of claim 10, wherein the counters of the plurality of counters are hardware counters.

17. The method of claim 10, wherein the types of interrupts include TLB (translation lookaside buffer) fault and VHPT (virtual hash page table) Instruction fault.

18. The method of claim 10, wherein when a count is about to overflow, an overflow signal is sent.

19. A computer program product in a computer readable medium, comprising:

first instructions for receiving an interrupt signal at an interrupt unit for initiating an interrupt in a processor;

second instructions for, responsive to receiving the interrupt signal, incrementing a first counter of a plurality of counters based on a type of interrupt among a plurality of types of interrupts associated with the interrupt signal;

wherein the plurality of counters counts the occurrence of interrupts by type of interrupt.

20. The computer program product of claim 19, and further comprising instructions for storing a count value of an interrupt type in an entry of an interrupt descriptor table that associates each interrupt with a corresponding interrupt handler.

21. The computer program product of claim 19, and further comprising instructions for storing a count value of an interrupt type in an entry of an interrupt count table outside of an interrupt descriptor table of the system.

22. A computer program product in a computer readable medium, comprising:

first instructions for receiving an interrupt signal at an interrupt unit for initiating an interrupt in a processor;

second instructions for, responsive to receiving the interrupt signal, incrementing a first counter associated with the interrupt signal;

wherein the first counter is one of a plurality of counters;

wherein the plurality of counters counts the occurrence of interrupts by type, a count value of an interrupt type being stored in an entry of an interrupt count table, wherein a count offset in an interrupt descriptor table corresponds to an interrupt type.

23. The computer program product of claim 22, wherein the count offset in the interrupt descriptor table is used to derive an offset address, corresponding to the count value of an interrupt type, in the interrupt count table.

24. A computer program product in a computer readable medium, comprising:

first instructions for receiving an interrupt signal at an interrupt unit for initiating an interrupt in a processor;

second instructions for, responsive to receiving the interrupt signal, incrementing a first counter associated with the interrupt signal;

wherein the first counter is one of a plurality of counters;

wherein the plurality of counters counts the occurrence of interrupts by type, a count value of an interrupt type being stored in an entry of an interrupt count table; and further comprising:

a register having a pointer to a memory address of the interrupt count table.

25. The computer program product of claim 19, wherein the counters of the plurality of counters are hardware counters.

26. The computer program product of claim 19, wherein the types of interrupts include TLB (translation lookaside buffer) fault and VHPT (virtual hash page table) Instruction fault.

27. The computer program product of claim 19, wherein when a count is about to overflow, an overflow signal is sent.

* * * * *